(12) United States Patent
Zhao et al.

(10) Patent No.: US 8,868,235 B2
(45) Date of Patent: Oct. 21, 2014

(54) BATTERY QUICK-CHANGE SYSTEM FOR AN ELECTRIC PASSENGER CAR CHASSIS HAVING A CARTESIAN COORDINATE ROBOT

(75) Inventors: Jinlong Zhao, JiNan (CN); Yutian Sun, JiNan (CN); Bingqiang Li, JiNan (CN); Huadong Zhang, JiNan (CN); Yong Sun, JiNan (CN)

(73) Assignee: Shandong Electric Power Research Institute, Jinan (CN)

( * ) Notice: Subject to any disclaimer, the term of this patent is extended or adjusted under 35 U.S.C. 154(b) by 0 days.

(21) Appl. No.: 13/877,041

(22) PCT Filed: Nov. 17, 2011

(86) PCT No.: PCT/CN2011/001920
§ 371 (c)(1),
(2), (4) Date: Mar. 29, 2013

(87) PCT Pub. No.: WO2012/162865
PCT Pub. Date: Dec. 6, 2012

(65) Prior Publication Data
US 2013/0226345 A1      Aug. 29, 2013

(30) Foreign Application Priority Data

May 27, 2011    (CN) .................... 2011 1 0140447
May 27, 2011    (CN) .................... 2011 2 0174592 U

(51) Int. Cl.
*B60S 5/06*        (2006.01)
*B25J 13/08*       (2006.01)

(52) U.S. Cl.
CPC .................. *B60S 5/06* (2013.01); *B25J 13/088* (2013.01); *Y10S 901/16* (2013.01)
USPC .............................. 700/253; 700/245; 901/16

(58) Field of Classification Search
CPC .............. B60S 5/06; B25J 9/02; B25J 9/1015; B25J 9/126; B25J 9/1612
USPC ......... 700/245, 253, 258; 901/16, 50; 701/22; 180/65.1, 68.5
See application file for complete search history.

(56) References Cited

U.S. PATENT DOCUMENTS 4,881,161 A * 11/1989 Thompson ...................... 700/63
5,040,767 A * 8/1991 Ohtomi ........................ 248/679
(Continued)

FOREIGN PATENT DOCUMENTS

CN        1339001 A      3/2002
CN        1467108 A      1/2004
(Continued)

OTHER PUBLICATIONS

Aug. 1, 2012 First Office Action issued in Chinese Patent Application No. 201110140447.5 (with partial English Translation).
(Continued)

*Primary Examiner* — Khoi Tran
*Assistant Examiner* — Spencer Patton
(74) *Attorney, Agent, or Firm* — Oliff PLC

(57) ABSTRACT

One type of battery quick-change system of electric passenger car chassis based on the Cartesian coordinate robot, including electric changing platform, and this platform, quick-change robot and charging rack along the same straight line; the quick-change robot comprises the battery tray and the Cartesian coordinate robot of four degrees of freedom, the Cartesian coordinate robot is associated with the X-axis driving motor, the Y-axis driving motor, the Z-axis up-down motor, the battery tray is connected with the R-axis driving motor; each of driving motors is connected with the corresponding encoder, and each of encoders is connected to the corresponding drive; there are equipped with a distance measuring sensor on the battery tray, and the corresponding limit switches on the both ends of each two-track rack; the drive, each limit switch and the distance measuring sensor of each driving motor are connected with the control system.

9 Claims, 7 Drawing Sheets

(56) References Cited

U.S. PATENT DOCUMENTS

| | | | |
|---|---|---|---|
| 5,545,967 A * | 8/1996 | Osborne et al. | ............... 320/109 |
| 6,094,028 A | 7/2000 | Gu et al. | |
| 2011/0113609 A1 * | 5/2011 | Berdelle-Hilge et al. | ... 29/426.1 |

FOREIGN PATENT DOCUMENTS

| | | |
|---|---|---|
| CN | 101214814 A | 7/2008 |
| CN | 201136484 Y | 10/2008 |
| CN | 101559758 B | 11/2010 |
| CN | 101992754 A | 3/2011 |
| CN | 201784595 U | 4/2011 |
| CN | 202130434 U | 2/2012 |
| CN | 101284524 B | 5/2012 |
| CN | 101870284 B | 11/2012 |
| CN | 101976731 B | 11/2012 |
| WO | WO 00/58139 | 10/2000 |

OTHER PUBLICATIONS

Mar. 8, 2012 International Search Report issued in International Application No. PCT/CN2011/001920 (with translation).

Mar. 8, 2012 Written Opinion of the International Searching Authority issued in International Application No. PCT/CN2011/001920 (with translation).

* cited by examiner

BATTERY QUICK-CHANGE SYSTEM FOR AN ELECTRIC PASSENGER CAR CHASSIS HAVING A CARTESIAN COORDINATE ROBOT

FIELD OF TECHNOLOGY

This invention relates to a robot control system for changing batteries of electric vehicles, especially relates to a battery quick-change system for an electric passenger car chassis having a Cartesian coordinate robot which can change the battery of electric passenger car chassis automatically and quickly.

BACKGROUND TECHNOLOGY

With the world's energy and environmental problems getting worse, the electrical energy as a clean energy source is widely used in automotive field, which provides a broad space of application for electric vehicles. However, due to the limitation of current battery energy density, the mileage range of electric vehicles is generally between one hundred to two hundred kilometers, which is far less an endurance mileage of conventional cars. Therefore, whether we can quickly provide energy supplies to cars directly affects the popularization and application of electric vehicles. Charging the battery takes a few hours to complete, and fast charge can impact the lifetime of the battery, at the same time, a single battery is very heavy, which is not convenient to replace manually. In response to this problem, researching robot for being able to replace the battery quickly is the only effective way to provide the rapid supply of vehicle energy.

There are mainly two energy supply methods, battery charging and battery changing for existing electric vehicles. There are lots of inefficiency in the charging mode, mainly because a full charge takes a long time; charging equipments need to be combined with long-term parking position, the layout of charging facilities lacks flexibility; outdoor charge can not be made in a cold climate of the northern winter; the batteries have no unified maintenance and management, which impacts the recycling lifetime of the batteries. In comparison, the battery changing way is provided with many significant advantages, for example, supplying energy fast (rapid electricity supply), less impact on battery life, easy to achieve commercialization, etc., which have obtained wide recognition from electric vehicle manufacturers, battery manufacturers and charge operators and so on.

In the context of intensive introduction of the policies for Chinese new energy automobile industry, the electricity charging station market of the domestic electric vehicles has started rapidly, and automatic battery changing technology has matured for electric buses, sanitation trucks and other models. But being subject to the constraints of the related technologies and the maturity of the industry, the automatic battery changing technology of electric passenger vehicles is still at the exploratory stage of development. In this case, the development of service network for intelligent electricity charging of electric passenger vehicles must rely on the innovation of battery changing technology to really promote the healthy and sustainable development of the electric vehicle industry.

An invention patent with Patent No. CN101559758A discloses a quick-change system which serves to support the chassis battery. This system is unable to achieve the automatic changing of the battery because this system only consists of interconnecting members between the battery and the vehicle, and does not have any positioning and guiding devices. An invention patent with Patent No. CN201784595U discloses an automatic changing system of the battery for electric vehicles, comprising the vehicle positioning platform, lifting equipment, etc. Because the positioning platform of this system can only locate the vehicles in the front and rear direction, if there has an angle (the chassis is tilted to a certain angle) between the chassis of electric vehicle for changing and the horizontal, when the lifting equipment is lifting battery box, it will cause excessive lifting or lifting without reaching the desired place, causing potential security risks for the vehicle after battery changing. Meanwhile, this system has proposed a changing method of the chassis battery and a method using an inclined plane pin to position the battery, but the error of this method used to position the battery in such a purely mechanical manner is large, and there is no information feedback, which is easy to damage the battery. Secondly, the system does not have the function of automatic battery identification.

Therefore, it is desired to develop a control system and a control method allowing the automatic identification of the battery and accurately positioning between the battery and the vehicle chassis to achieve fast, accurate and secure energy supplies of the electric vehicles, thereby contributing to the promotion and application of the electric cars.

SUMMARY OF THE INVENTION

The purpose of this invention is to overcome these shortcomings, and provide a battery quick-change system of electric passenger car chassis based on a Cartesian coordinate robot, so that automatic positioning for the electric vehicles can be achieved by an electric changing platform, and also the quick-change robot can help to achieve the dismantlement and installation of the battery quickly and accurately, thereby providing a convenient, fast and economic way of battery replacement for electricity charging stations of electric passenger cars, which makes up for the deficiency of taking a long time to charge the vehicle, greatly improves the traveling mileage of the electric vehicles, and makes it possible for endurable travelling of the electric vehicles, and which can adjust the posture of the battery, identify the battery automatically and replace the battery of the vehicle quickly, accurately and safely to achieve the control of the Cartesian coordinate robot in three directions, to correct and position the battery with small angle and make information interaction between the main control systems.

In order to achieve the above contents, this invention employs the following technical solutions:

A battery quick-change system for an electric passenger car chassis based on a Cartesian coordinate robot. The system comprises an electric changing platform, a quick-change robot and a charging rack, which are collinear along a straight line; the quick-change robot comprises a battery tray and the Cartesian coordinate robot with four degrees of freedom, the Cartesian coordinate robot comprises an X-axis linear positioning system, a Z-axis up-down platform, a Y-axis telescopic platform and a R-axis angle correction system; the X-axis linear positioning system comprises an X-axis two-track rack, the Z-axis up-down platform comprises a Y-axis two-track rack, and the R-axis angle correction system comprises a R-axis driving motor; both ends of the X-axis two-track rack extend to the electric changing platform and charging rack respectively; the Z-axis two-track rack is connected with the X-axis two-track rack vertically and movably, and the Y-axis two-track rack is mounted on the vertically movable Z-axis two-track rack; cooperatively, an X-axis driving motor is provided on X-axis two-track rack, a Y-axis driving motor is provided on the Y-axis two-track rack, a Z-axis up-down motor is provided on the Z-axis two-track rack, and the battery tray connected with the R-axis driving motor is provided on Y-axis two-track rack. Each of the driving motors is connected with a corresponding encoder, and each of the encoders is connected to a corresponding driver. A distance measuring sensor is provided on the battery tray, and a corresponding limit switch is provided on both ends of each two-track rack; each driver, each limit switch and the distance measuring sensor of each driving motor are connected with the control system.

The X-axis driving motor, the Y-axis driving motor, the Z-axis up-down motor and the R-axis driving motor are all stepping motor, which are respectively equipped with gears in conjunction with the corresponding two-track racks.

The X-axis driving motor and the Z-axis up-down motor move in a linked manner. Only when the X-axis driving motor and the Z-axis up-down motor reach a set position, can the Y-axis driving motor take its movement. Only when the Y-axis driving motor moves to a specified position, can the R-axis driving motor be in motion.

Between the X-axis two-track rack and the Z-axis two-track rack, the Z-axis two-track rack and the Y-axis two-track rack are respectively and perpendicularly in connection with each other through a slider.

The control system comprises a host computer, a motion control module connected with the host computer, a battery management module, a battery identification module, and a detection module of battery position. The motion control module comprises a PLC controller and an operating handle; the PLC controller is connected to the each limit switch and also to the corresponding encoder through each driver at the same time, the PLC controller is also connected with an emergency stop switch; the PLC controller is in communication with the host computer via a CAN Bus; the operating handle is connected with the host computer; and the detection module of battery position is in connection with the distance measuring sensor.

The battery identification module is connected with a RFID Reader.

The distance measuring sensor is actually a laser distance measuring sensor, which is connected with the host computer through the detection module of battery position via the CAN Bus.

The detection module of battery position is actually two DMP sensors, which are mounted on the battery tray to cooperate with a reflective device provided on the battery charging station.

The host computer is in connection with the battery management module, the PLC controller, the battery identification module, the detection module of battery position and the operating handle via the CAN Bus.

The electric changing platform is equipped with a stop bit in V-shaped for electric changing vehicles.

The electric changing platform of this invention provides a working platform which can carry a weight of 2.5 tons for the replacement of the chassis battery of the electric passenger car. The electric changing platform is of a metal welded structure. There is a leveling device between the platform and the ground. The platform is equipped with the function of automatic front and rear positioning to the vehicle, and there has been designed a V-shaped stop bit in the front of the platform. After the front wheel of the vehicle moves into the V-shaped stop bit, the vehicle stops automatically in the middle of the V-shaped stop bit by its own gravity. The electric changing platform has a detection device (Card Reader) for the vehicle that can determine if there are any vehicles driving into. When the vehicle needing for electric changing drives into the electric changing platform, the Card Reader can read the RFID (Radio Frequency Identification Devices) installed in the front of the vehicle to detect the presence of the vehicle, the control system sends the information of the presence or absence of a vehicle to the quick-change robot and background monitoring system through the Bus in real time.

The quick-change robot of this invention comprises a battery tray and the Cartesian coordinate robot of four degrees of freedom. The Cartesian coordinate robot of four degrees of freedom is able to move in three directions of X, Y, Z and rotate in a R-axis of the battery tray with small angle. The movement in the three directions of X, Y, Z is like a servo motor to drive the gear shaft at both ends, so as to achieve the translation of the corresponding direction via the synchronous rotation of the gear on the corresponding two-track rack.

The control system comprises: the host computer, a battery management system (BMS), and a motion control system. This motion control system comprises: Siemens S7-300-315 PLC controller, limit switches, an operating handle, and servo motors.

In addition, the host computer is also connected with the detection module of the battery position, a laser distance measuring sensor, a DMP sensor, an RFID tag, etc.

The battery management system (BMS) communicates with each battery via the CAN Bus. The host computer makes information interaction with the main controller, Siemens S7-300-315 PLC controller through the CAN Bus. The battery management system submits the information of the battery to the monitoring system of the host computer via the CAN Bus. The monitoring system of the host computer is installed with a RFID tag reader for reading the RFID tag on the battery to confirm the information, such as the power level of each battery.

The limit switch is installed on both ends of each two-track rack. The X-axis driving motor and the Z-axis up-down motor move in a linked manner. Only when the X-axis driving motor and the Z-axis up-down motor reach a set position, can the Y-axis driving motor take its movement. Only when the Y-axis driving motor moves to a specified position, can the R-axis driving motor be in motion.

The operating handle can demonstrate the coordinates to the robot, by demonstrating to read all encoders of motors, recording the current coordinate value and uploading to the control system of the host computer for storage.

The motion control system can detect the position and angle for removing a battery relative to the battery tray, and perform local storage. When removing a fully charged battery from the battery charging station, the motion control system can adjust and recover the posture of the battery according to the data stored in.

The robot has two DMP sensors mounted on. When picking up and placing the battery relative to the battery charging station, firstly, it needs to make preliminary positioning in accordance with the coordinate value of the demonstrating storage, and secondly, two DMP sensors take positioning for the reflective device provided on the battery charging station, and then for a second confirmation, only after two error-free confirmations, can the robot manipulator pick up and place the battery.

Each battery is affixed with a unique RFID identification, and the Reader is installed on the battery tray. When the position where the quick-change robot can pick up the battery is determined, the Card Reader will read the identification of the battery to make local verification and provide a confirmation message to the background monitoring system.

The battery charging rack provides a reliable storage position for the battery of the electric passenger car, and achieves automatic charging operation of the battery by means of auxiliary mechanism. The battery charging rack is of metal welded structure, and a storage position serves as an independent unit, which connects to each other by bolts.

The operating procedures of the said control system include the following steps:

After a vehicle drives into the V-shaped stop bit of an electric changing platform, the electric changing platform will report the presence of the vehicle to the background monitoring system which will send work instruction to the quick-change robot via the Bus after receiving the report information;

The quick-change robot moves quickly to the bottom of the chassis of the electric changing vehicle for implementing the action of removing the battery through the position control function of the position control module, detects the position of removing the battery, and records the relevant data.

The quick-change robot moves from the bottom of the vehicle chassis, drops to a safe position, and adjusts the position of the battery to a correct placement.

The quick-change robot moves to the specified position (empty) of the battery charging rack, detects to determine the position (by the DMP sensor), puts the battery on the charging rack, makes identification (by the RED Card Reader), and then uploads to the background monitoring system. After that the quick-change robot exits.

In accordance with the instruction of the background monitoring system, the quick-change robot moves to the specified position (fully charged battery) of the battery charging rack, detects to determine the position (by the DMP sensor) and battery identity (by the RFID Card Reader), and after confirming without any error, takes down the battery from the charging rack. After that the quick-change robot exits.

The quick-change robot drops to a safe position, and makes lateral movement to the front of the vehicle chassis; and adjusts the position of the battery to a certain angle suitable for installation (by R-axis angle correction system and the memory information of removed battery earlier).

The battery tray of the quick-change robot moves to the bottom of the vehicle chassis, and installs the battery to the vehicle.

The quick-change robot leaves from the bottom of the vehicle chassis, returns to the safe position and waits for the next work instruction. The workflow of the quick-change robot of this invention is as follows:

After the system is powered on, the reset instruction is issued by the host computer. The limit switch in all directions of the robot is zeroed. The host computer records the current position as the origin of the coordinates of the robot movement.

Removing the battery: when the vehicle safely stops at the electric changing platform, the quick-change robot according to the coordinate point demonstrated accurately extends the battery tray to the bottom of the battery. The Z-axis up-down motor moves upward until triggering the limit switch mounted on the robot manipulator. At this time, the robot manipulator releases, removes the battery, detects the position and angle of the battery relative to itself by three laser distance measuring sensors, and conducts local storage.

Placing the battery: the PLC controller accepts the empty charging station label issued by the host computer and matches with the Database to find out the corresponding coordinate value. The robot manipulator carries the battery to the corresponding charging station to verify and make secondary confirmation by the DMP sensor, and places the battery to the corresponding charging station accurately for charging the battery. When the battery is fully charged, the battery management system will inform the host computer, and the host computer gives command to change the RFID tag to full flag, and then this information will be uploaded back to the host computer for recording.

Picking up the battery: the PLC controller accepts the full charging station label issued by the host computer and matches with the Database to find out the corresponding coordinate value. The robot manipulator reaches to the corresponding charging station to verify and make secondary confirmation by DMP sensor, and then picks up the battery. In this case, the host computer sets this charging station label as vacancy.

Installing the battery: the PLC controller controls the robot manipulator to reach to the bottom of the vehicle in accordance with the coordinate value when removing the battery, and according to the position and angle of the battery when removing the battery, rectifies the deviation for the battery through rotating electrical machine mounted on the robot manipulator, restores the posture of the battery when removed, and installs the battery accurately to the bottom of the vehicle, the robot returns back to the standby position of the origin to complete the entire process for electric changing.

The beneficial effects of this invention are: to adjust the posture of the battery, identify the battery automatically and replace the battery of the vehicle quickly, accurately and safely to achieve the control of the Cartesian coordinate robot in three directions, to correct and position the battery with small angle and make information interaction between the main control systems.

Wherein, 1. electric changing vehicle, 2. electric changing platform, 3. quick-change robot, 4. charging rack, 5. X-axis linear positioning system, 6. Z-axis up-down platform, 7. Y-axis telescopic platform, 8. R-axis angle correction system, 9. battery tray, 10. battery, 11. V-shaped stop bit, 12. X-axis two-track rack, 13. X-axis driving motor, 14. Y-axis driving motor, 15. R-axis driving motor, 16. Z-axis up-down motor, 17. Z-axis two-track rack, 18. driver, 19. distance measuring sensor, 20. Y-axis two-track rack, 21. battery management module, 22. PLC controller, 23. operating handle, 24. limit switch, 25. encoder, 26. emergency stop switch, 27. host computer, 28. battery identification module, 29. RFID Reader, 30. detection module of battery position.

MODE OF CARRYING OUT THE INVENTION

This invention will be further described below using embodiments and referring to the figures.

Figure 1:
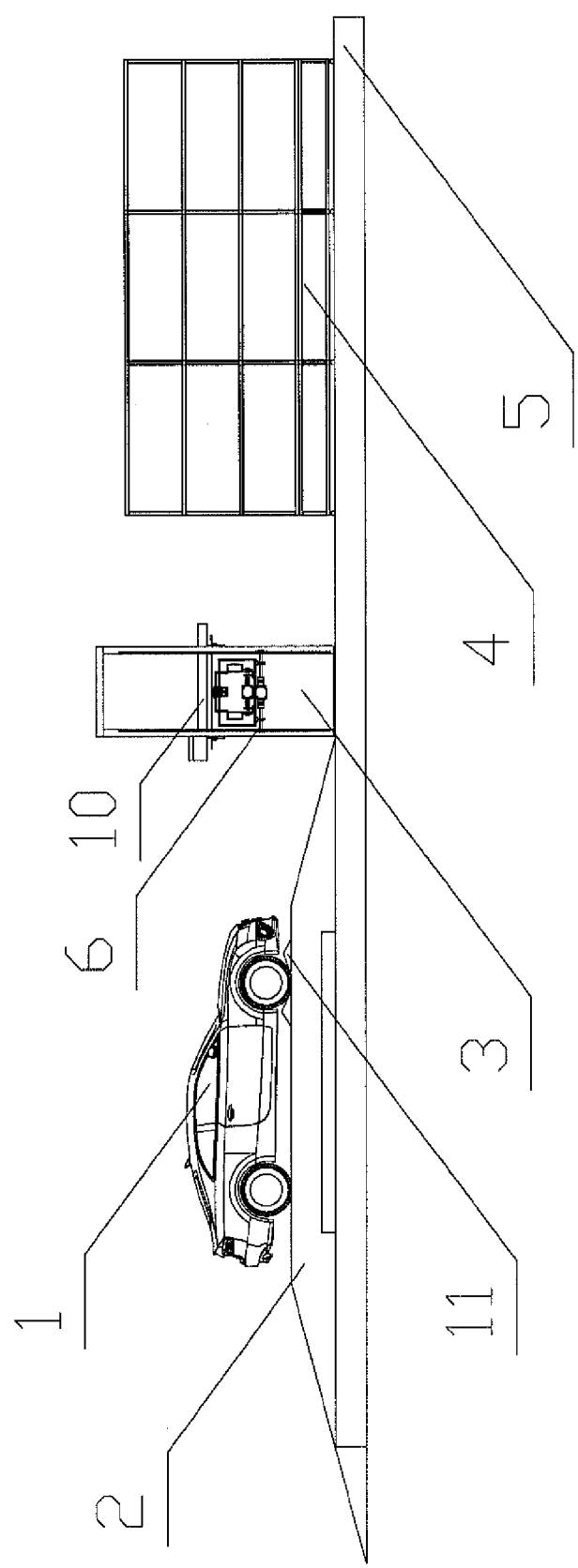
FIG. 1, a main view of the structure of a battery quick-change system for an electric passenger car chassis having a Cartesian coordinate robot according to one embodiment of the invention.
Figure 2:
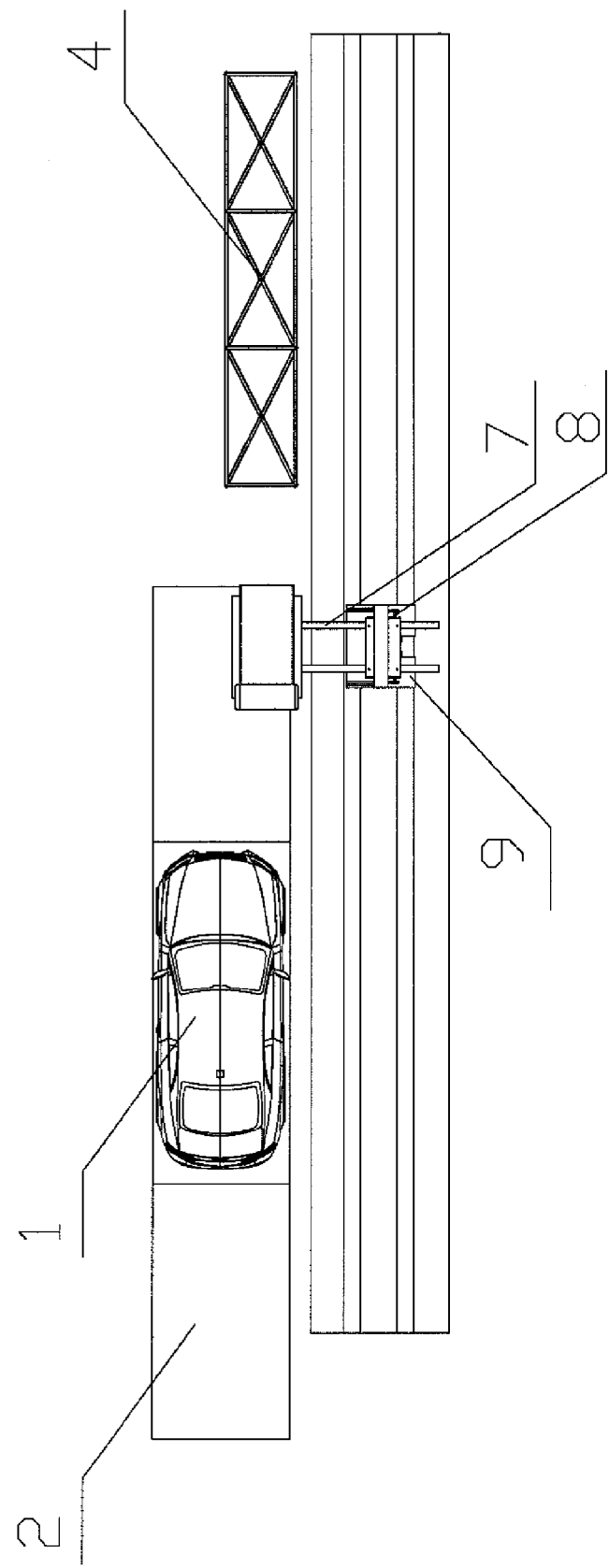
FIG. 2, a corresponding plan view of the structure in FIG. 1.
Figure 3:
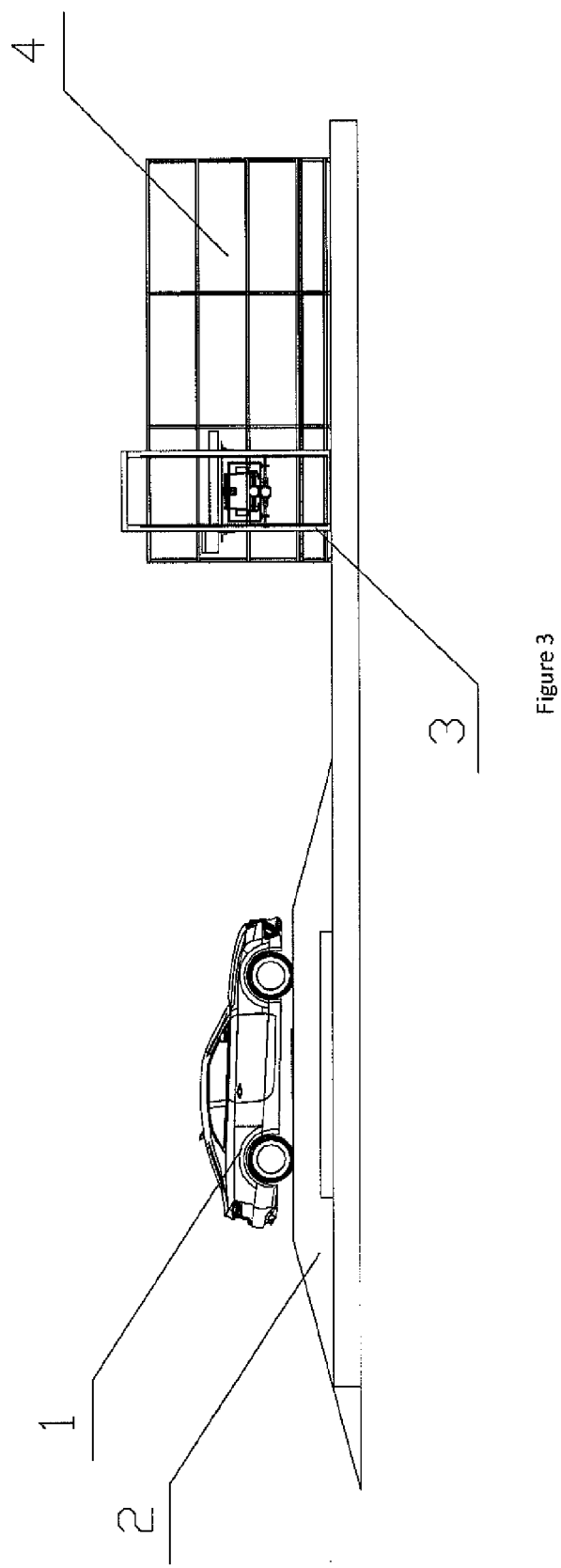
FIG. 3, a main view of the system structure when the quick-change robot picks up the battery.
Figure 4:
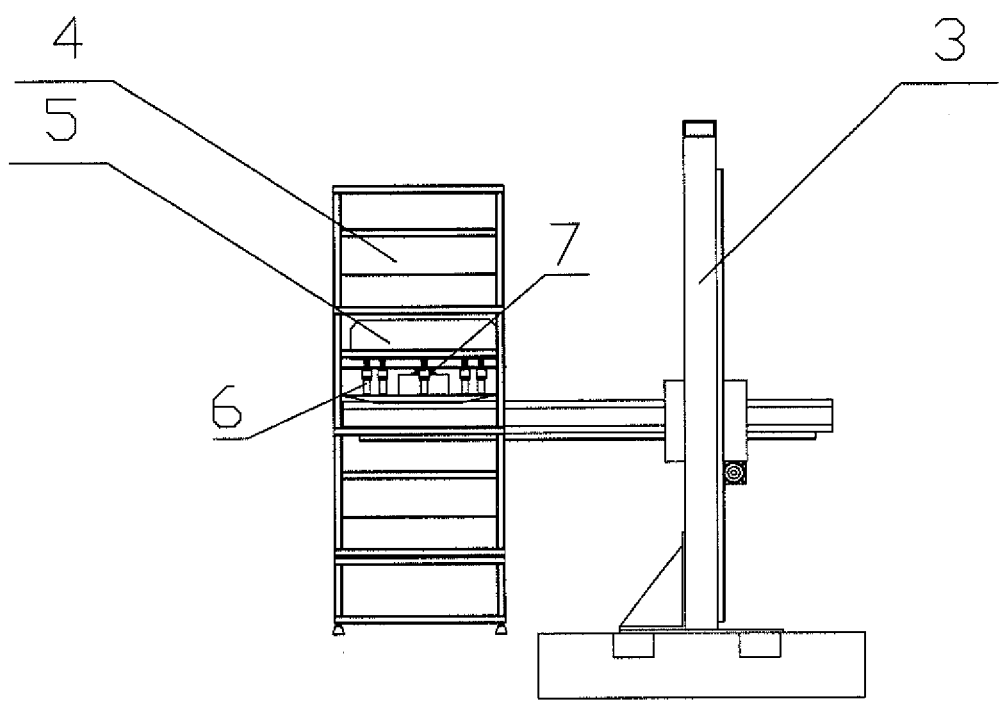
FIG. 4, a corresponding plan view of FIG. 3 (the electric changing vehicle is not shown)
Figure 5:
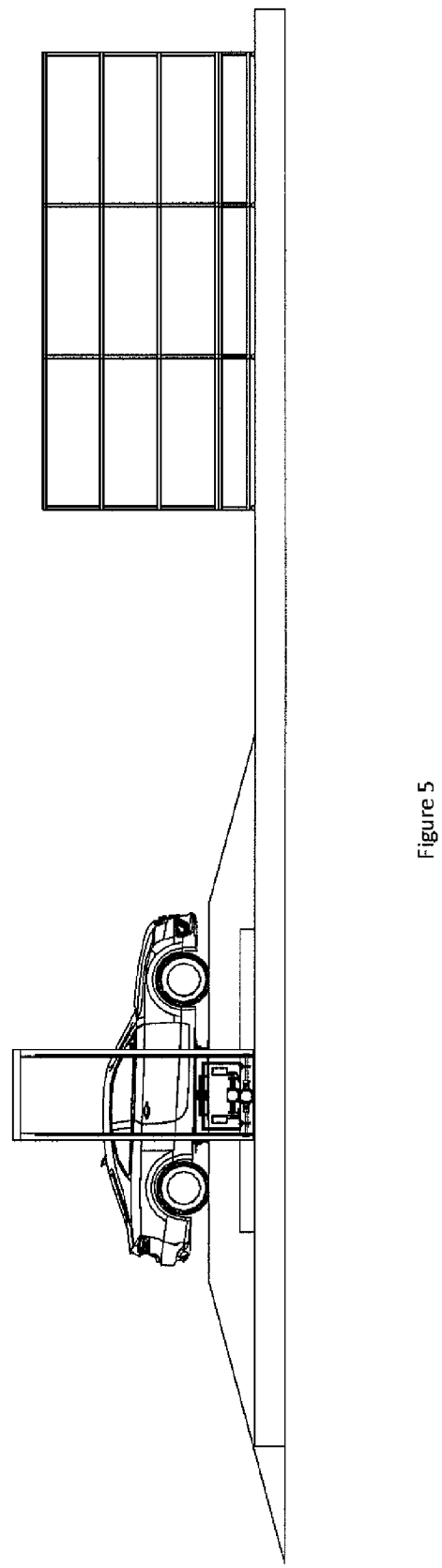
FIG. 5, a main view of the system structure when the quick-change robot places the battery.
Figure 6:
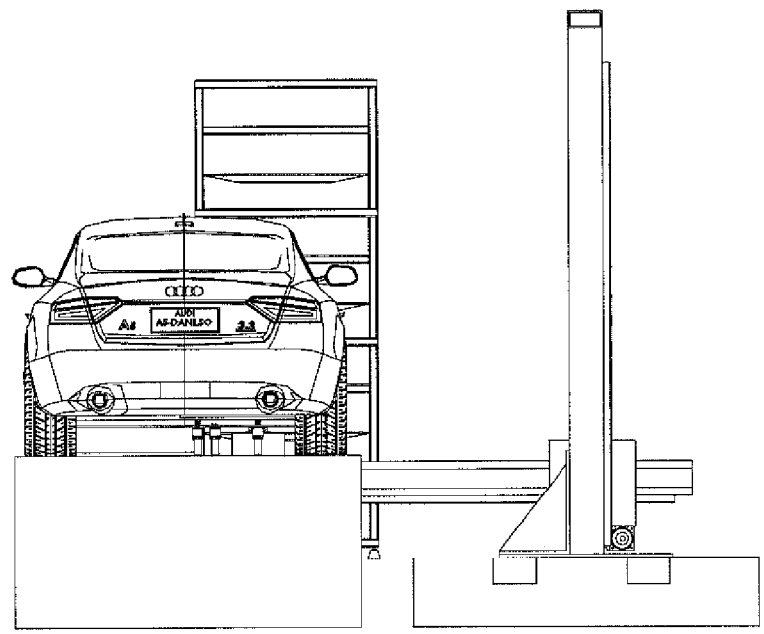
FIG. 6, a corresponding view of FIG. 3.
Figure 7:
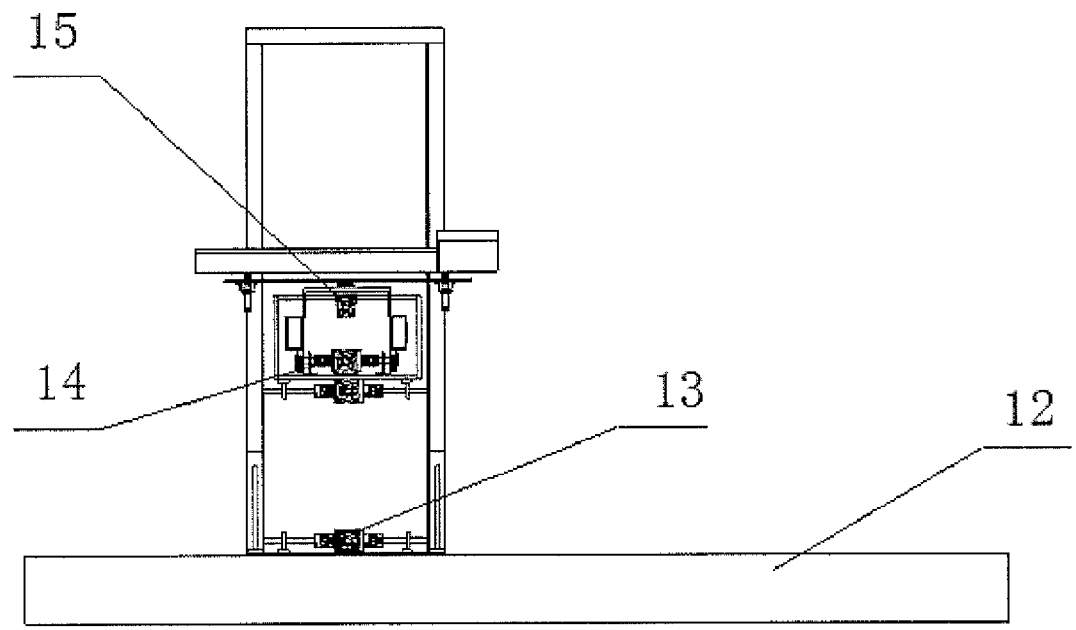
FIG. 7, a schematic front view of the quick-change robot.
Figure 8:
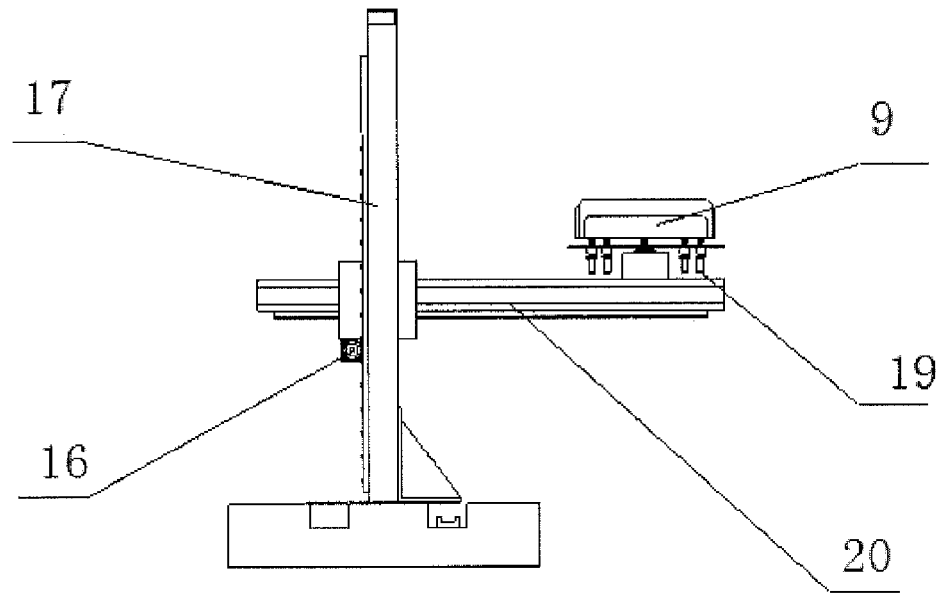
FIG. 8, a left view of the quick-change robot.
Figure 9:
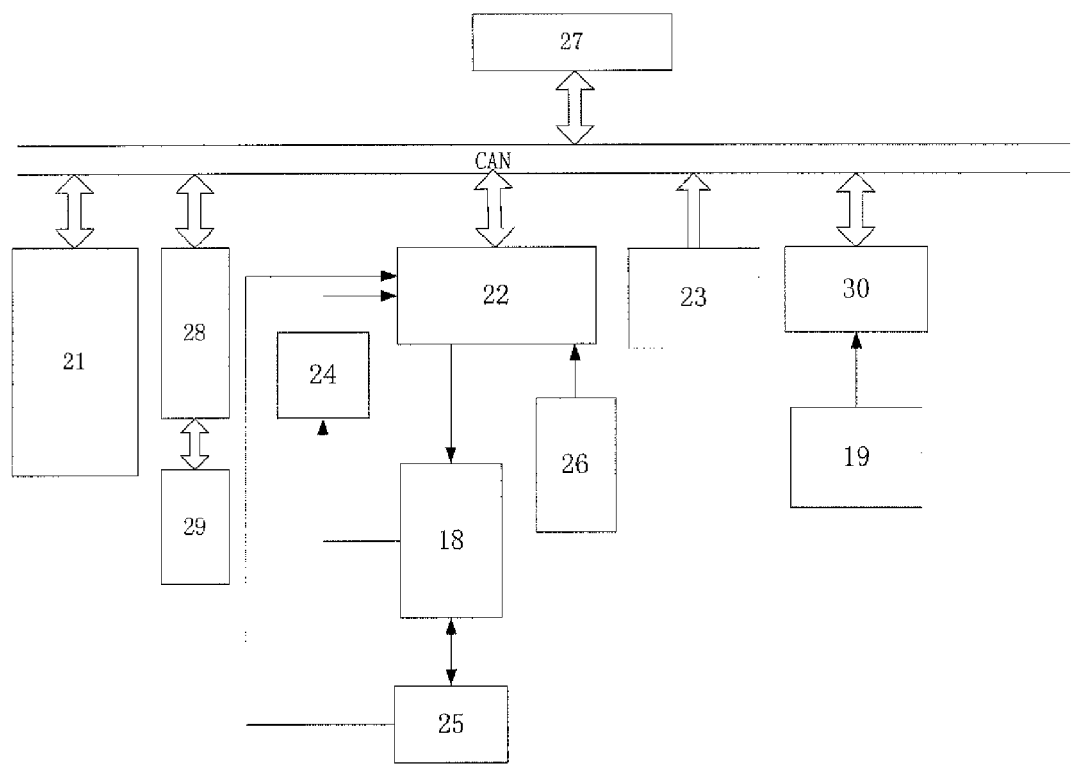
FIG. 9, a control system block diagram of the quick-change robot.

As shown in FIG. 1 to FIG. 9, a battery quick-change system for an electric passenger car chassis having a Cartesian coordinate robot, comprises an electric changing platform 2, a quick-change robot 3 and a charging rack 4 collinearly arranged along a straight line. The quick-change robot 3 comprises a battery tray 9 and the Cartesian coordinate robot with four degrees of freedom. The Cartesian coordinate robot comprises an X-axis linear positioning system 5, a Z-axis up-down platform 6, a Y-axis telescopic platform 7 and a R-axis angle correction system 8. The X-axis linear positioning system 5 comprises an X-axis two-track rack 12. The Z-axis up-down platform 6 comprises a Y-axis two-track rack 20. The R-axis angle correction system 8 comprises a R-axis driving motor 15. Both ends of the X-axis two-track rack 12 extend separately to the electric changing platform 2 and the charging rack 4. The Z-axis two-track rack 17 is connected with the X-axis two-track rack 12 vertically and movably, and the Y-axis two-track rack 20 is mounted on the Z-axis two-track rack 17 vertically and movably. Cooperatively, the X-axis driving motor 13 is provided on the X-axis two-track rack 12, the Y-axis driving motor 14 on the Y-axis two-track rack 20, the Z-axis up-down motor 16 on the Z-axis two-track rack 17, and the battery tray 9 connected with the R-axis driving motor 15 is provided on the Y-axis two-track rack 20. Each of the driving motors is connected with a corresponding encoder 25, and each encoder 25 is connected to a corresponding driver 18. A distance measuring sensor 19 is provided on the battery tray 9, and corresponding limit switches 24 are provided on both ends of each two-track rack. The driver 18, each limit switch 24 and the distance measuring sensor 19 of each driving motor are connected with the control system.

The X-axis driving motor 13, the Y-axis driving motor 14, the Z-axis up-down motor 16 and the R-axis driving motor 15 are all stepping motors, which are respectively equipped with gears in conjunction with the corresponding two-track racks.

The X-axis driving motor 13 and the Z-axis up-down motor 16 move in a linked manner. Only when the X-axis driving motor 13 and the Z-axis up-down motor 16 reach a set position, can the Y-axis driving motor 14 take its movement. Only when the Y-axis driving motor 14 moves to a specified position, can the R-axis driving motor 15 be in motion.

The X-axis two-track rack 12 and the Z-axis two-track rack 17, and the Z-axis two-track rack 17 and the Y-axis two-track rack 20 are respectively and perpendicularly in connection with each other through a slider.

The control system comprises a host computer 27, a motion control module connected with the host computer 27, a battery management module 21, a battery identification module 28, and a detection module of battery position 30. The motion control module comprises a PLC controller 22 and an operating handle 23; the PLC controller 22 is connected to each limit switch 24 and also to the corresponding encoder 25 through each driver 18; at the same time, the PLC controller 22 is also connected with an emergency stop switch 26; the PLC controller 22 is in communication with the host computer 27 via the CAN Bus; the operating handle 23 is connected with the host computer 27; the detection module of battery position 30 is in connection with the distance measuring sensor 19.

The battery identification module 28 is connected with the RFID Reader 29.

The distance measuring sensor 19 is actually a laser distance measuring sensor, which is connected with the host computer 27 through the detection module of battery position 30 via the CAN Bus.

The detection module of battery position 30 is actually two DMP sensors, which are mounted on the battery tray 9 to cooperate with a reflective device provided on the battery charging station.

The host computer 27 is in connection with the battery management module 21, the PLC controller 22, the battery identification module 28, the detection module of battery position 30 and the operating handle 23 via the CAN Bus.

The electric changing platform 2 is equipped with a stop bit 11 in V-shaped for electric changing vehicles 1.

After the overall system is powered on, a reset instruction is issued by the host computer 27, each of the drive motors of the robot is reset, and the host computer 27 records the current position as the origin of the coordinates of the robot movement.

After a vehicle drives into the V-shaped stop bit 11 of an electric changing platform, the electric changing platform 1 will report the presence of the vehicle to the background monitoring system which will send work instruction to the quick-change robot 3 via the Bus after receiving the report information;

The quick-change robot 3 moves quickly to the bottom of the chassis of the electric changing vehicle 1 for implementing the action of removing the battery through the position control function of the position control module of the X-axis linear positioning system 5, the Z-axis up-down platform 6 and the Y-axis telescopic platform 7; detects the position of removing the battery, and records the relevant data.

The quick-change robot 3 moves from the bottom of the vehicle chassis and drops to a safe position; and adjusts the position of the battery to a correct placement through R-axis angle correction system 8.

The quick-change robot 3 moves to a specified position (empty) of the battery charging rack 4, detects to determine the position (by the DMP sensor), puts the battery on the charging rack 4, makes identification (by the RFID Card Reader), and then uploads to the background monitoring system. After that the quick-change robot 3 exits.

In accordance with the instruction of the background monitoring system, the quick-change robot 3 moves to the specified position (fully charged battery) of the battery charging rack 4, detects to determine the position (by the DMP sensor) and battery identity (by the RFID Card Reader), and after confirming without any error, takes down the battery from the charging rack 4. After that the quick-change robot 3 exits.

The quick-change robot 3 drops to a safe position, makes lateral movement to the front of the vehicle chassis, and adjusts the position of the battery to a certain angle suitable for installation (by R-axis angle correction system 8 and the memory information of the removed battery earlier).

The battery tray 9 of the quick-change robot 3 moves to the bottom of the vehicle chassis, and installs the battery on the vehicle.

The quick-change robot 3 leaves from the bottom of the vehicle chassis, returns to the safe position and waits for the next work instruction.

The carrying out processes of the quick-change robot 3: according to the coordinate point demonstrated before, the robot extends the battery tray 9 to the bottom of the vehicle battery accurately, the Y-axis two-track rack 20 moves upward for removing the battery, the robot detects the position and angle of the battery relative to the robot manipulator by three distance measuring sensors 19, and conducts local storage.

Each driving motor accepts the work instruction, checks to confirm by DMP sensor, and places the battery to the corresponding charging station accurately for charging the battery.

When the battery is fully charged, the battery management module 21 will inform the host computer 27, and the host computer 27 gives command to change the RFID tag to full flag, and then this information will be uploaded back to the host computer 27 for recording.

The PLC controller 22 accepts the full charging station label issued by the host computer 27 and matches with the Database to find out the corresponding coordinate value. The battery tray 9 reaches to the corresponding charging station to verify and make secondary confirmation by DMP sensor, and then picks up the battery. In this case, the host computer 27 sets this charging station label as vacancy.

The PLC controller 22 controls the robot manipulator to reach to the bottom of the vehicle in accordance with the coordinate value when removing the battery, and according to the position and angle of the battery when removing the battery, rectifies the deviation for the battery through the R-axis driving motor 15 mounted on the robot manipulator, restores the posture of the battery when removed, and installs the battery accurately to the bottom of the vehicle, the robot returns back to the standby position of the origin to complete the entire process for electric changing.

The invention claimed is:

1. A battery quick-change system for an electric passenger car chassis, comprising:
    a battery changing platform;
    a quick-change robot; and
    a charging rack,
    wherein:
        the battery changing platform is collinear with the quick-change robot and the charging rack in an X-direction extending horizontally;
        the quick-change robot comprises a battery tray and a Cartesian coordinate robot with four degrees of freedom,
        the Cartesian coordinate robot comprises an X-axis linear positioning system, a Z-axis up-down platform, a Y-axis telescopic platform and a R-axis angle correction system,
        the X-axis linear positioning system comprises an X-axis two-track rack that enables movement in the X-axis direction, the Z-axis up-down platform comprises a Z-axis two-track rack and a Y-axis two-track rack, and the R-axis angle correction system comprises an R-axis driving motor,
        two ends of the X-axis two-track rack extend in the X-axis direction to the battery changing platform and charging rack, respectively,
        the Z-axis two-track rack is connected with the X-axis two-track rack and moves vertically in a Z-axis direction,
        the Y-axis two-track rack moves horizontally in a Y-axis direction that is perpendicular to the X-axis direction,
        the Y-axis two-track rack is mounted on the Z-axis two-track rack,
        each two-track rack has two parallel running tracks over which a part of the Cartesian coordinate robot moves,
        the battery tray is connected with the R-axis driving motor,
        an X-axis driving motor is provided on the X-axis two-track rack, a Y-axis driving motor is provided on the Y-axis two-track rack, a Z-axis up-down motor is provided on the Z-axis two-track rack, and the R-axis driving motor is provided on the Y-axis two-track rack,
        each of the X-axis driving motor, Y-axis driving motor, Z-axis up-down motor and R-axis driving motor is connected with a corresponding encoder, and each of the encoders is connected to a corresponding driver,
        the battery tray is equipped with a distance measuring sensor,
        a limit switch is installed on each end of each two-track rack,
        each driver, each limit switch and the distance measuring sensor are connected with a control system,
        the X-axis driving motor and the Z-axis up-down motor move in a linked manner,
        the Y axis-driving motor drives only once the X-axis driving motor and the Z-axis up-down motor reach a set position, and
        the R-axis driving motor drives only once the Y-axis driving motor moves to a specified position.

2. The battery quick-change system according to claim 1, wherein the X-axis driving motor, the Y-axis driving motor, the Z-axis up-down motor and the R-axis driving motor are all stepping motors, which are equipped with gears in conjunction with the corresponding two-track racks.

3. The battery-quick-change system according to claim 1, wherein the X-axis two-track rack and the Z-axis two-track rack, the Z-axis two-track rack and the Y-axis two-track rack are perpendicularly connected with each other through a respective slider.

4. The battery quick-change system according to claim 1, wherein the control system comprises:
    a host computer;
    a motion control module connected with the host computer;
    a battery management module;
    a battery identification module; and
    a detection module of battery position for detecting battery position, wherein
    the motion control module comprises a PLC controller and an operating handle,
    the PLC controller is connected to each limit switch and also to the corresponding encoder though each driver,
    the PLC controller is connected with an emergency stop switch,
    the PLC controller is in communication with the host computer via a CAN Bus,
    the operating handle is connected with the host computer, and
    the detection module of battery position is in connection with the distance measuring sensor.

5. The battery quick-change system according to claim 4, wherein the battery identification module is connected with an RFID Reader.

6. The battery quick-change system according to claim 4, wherein the distance measuring sensor is a laser distance measuring sensor, which is connected with the host computer through the detection module of battery position via the CAN Bus.

7. The battery quick-change system according to claim 4, wherein the detection module of battery position comprises two sensors that determine the battery position, which are mounted on the battery tray to cooperate with a reflective device provided on a battery charging station.

8. The battery quick-change system according to claim 4, wherein the host computer is in connection with the battery management module, the PLC controller, the battery identification module, the detection module of battery position and the operating handle via the CAN Bus.

9. The battery quick-change system according to claim 1, wherein the battery changing platform is equipped with a V-shaped stop bit.

* * * * *